US009847629B2

(12) United States Patent
Moisei et al.

(10) Patent No.: US 9,847,629 B2
(45) Date of Patent: Dec. 19, 2017

(54) INSTRUMENTATION TRANSFER STRUT

(71) Applicant: United Technologies Corporation, Hartford, CT (US)

(72) Inventors: Dorel M. Moisei, West Hartford, CT (US); Michael D. Greenberg, Bloomfield, CT (US); Stephen N. Koren, Jr., Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 219 days.

(21) Appl. No.: 14/768,997

(22) PCT Filed: Mar. 13, 2014

(86) PCT No.: PCT/US2014/025708
§ 371 (c)(1),
(2) Date: Aug. 19, 2015

(87) PCT Pub. No.: WO2014/151425
PCT Pub. Date: Sep. 25, 2014

(65) Prior Publication Data
US 2016/0006226 A1 Jan. 7, 2016

Related U.S. Application Data

(60) Provisional application No. 61/789,705, filed on Mar. 15, 2013.

(51) Int. Cl.
*H02G 3/04* (2006.01)
*F01D 21/00* (2006.01)
(Continued)

(52) U.S. Cl.
CPC ......... *H02G 3/0481* (2013.01); *B22F 3/1055* (2013.01); *B22F 5/10* (2013.01);
(Continued)

(58) Field of Classification Search
CPC .... B60R 16/08; H02G 3/0481; H02G 3/0608; H02G 3/0437; H02G 3/0462
See application file for complete search history.

(56) References Cited

U.S. PATENT DOCUMENTS

| 4,316,098 A | 2/1982 | Freitag et al. |
| 4,948,264 A | 8/1990 | Hook, Jr. |

(Continued)

FOREIGN PATENT DOCUMENTS

| CN | 1506560 A | 6/2004 |
| CN | 102004383 A | 4/2011 |

(Continued)

OTHER PUBLICATIONS

Office Action from Chinese Application Serial No. 201480016088.4, dated Aug. 2, 2016, 12 pages.

(Continued)

*Primary Examiner* — Timothy Thompson
*Assistant Examiner* — Amol Patel
(74) *Attorney, Agent, or Firm* — Kinney & Lange, P.A.

(57) ABSTRACT

A monolithic lead separator includes a primary lead tube defining a primary channel, a plurality of secondary lead tubes formed monolithically with the primary lead tube, and an instrumentation lead splitter. A cap is positioned in an aperture in the instrumentation lead splitter in a fluid-tight manner. Each of the secondary channels intersects the primary channel. The instrumentation lead splitter is situated at the intersection of the primary channel and the secondary channels.

20 Claims, 6 Drawing Sheets

(51) Int. Cl.
   *B60R 16/03* (2006.01)
   *B22F 5/10* (2006.01)
   *B22F 3/105* (2006.01)
   *F01D 9/06* (2006.01)
   *F16L 41/02* (2006.01)
   *F01D 17/02* (2006.01)
   *F01D 17/08* (2006.01)
   *B29C 67/00* (2017.01)
   *B33Y 10/00* (2015.01)
   *B33Y 80/00* (2015.01)

(52) U.S. Cl.
   CPC .............. *B22F 5/106* (2013.01); *B60R 16/03* (2013.01); *F01D 9/065* (2013.01); *F01D 17/02* (2013.01); *F01D 17/08* (2013.01); *F01D 17/085* (2013.01); *F01D 21/003* (2013.01); *F16L 41/02* (2013.01); *B22F 2003/1056* (2013.01); *B29C 67/0077* (2013.01); *B33Y 10/00* (2014.12); *B33Y 80/00* (2014.12); *F05D 2220/32* (2013.01); *F05D 2230/22* (2013.01); *F05D 2230/53* (2013.01); *F05D 2270/808* (2013.01); *F05D 2270/821* (2013.01); *Y02P 10/295* (2015.11)

(56) References Cited

U.S. PATENT DOCUMENTS

| | | |
|---|---|---|
| 5,157,914 A | 10/1992 | Schwarz et al. |
| 6,546,735 B1 | 4/2003 | Moniz et al. |
| 7,370,739 B2 | 5/2008 | Tsukamoto et al. |
| 9,057,470 B1 * | 6/2015 | Gosse ............... H02G 3/06 |
| 2001/0051095 A1 | 12/2001 | Schotsch et al. |
| 2011/0252808 A1 | 10/2011 | McKenney et al. |
| 2012/0297792 A1 | 11/2012 | Dillard et al. |
| 2015/0354738 A1* | 12/2015 | Morse ............... H02G 3/06 285/39 |
| 2016/0061367 A1* | 3/2016 | Smith ............... F16L 25/00 285/179.1 |

FOREIGN PATENT DOCUMENTS

| | | |
|---|---|---|
| CN | 102197518 A | 11/2012 |
| WO | 2011136201 A1 | 11/2011 |

OTHER PUBLICATIONS

International Searching Authority, PCT Notification of Transmittal of the International Search Report and the Written Opinion, dated Jul. 18, 2014, 12 pages.

* cited by examiner a central, longitudinal axis or axial centerline CL. Gas turbine engine 10 includes in flow series order from front to rear, low pressure compressor 12, high pressure compressor 14, combustor 16, high pressure turbine 18, and low pressure turbine 20. Power turbine 22 is attached to the rear of low pressure turbine 20 and is connected to electrical generator 24.

INSTRUMENTATION TRANSFER STRUT

BACKGROUND

Gas turbine engines commonly include struts designed to transfer mechanical load between concentric engine sections. For example, struts may be used to transfer mechanical loads on a liner, duct, compressor section, or turbine section to a frame, or from the frame to an engine mount.

Often, struts are also used for transmission of necessary materials or information. For example, struts may be used to transfer oil, fuel, air, or wiring for electrical connections between the exterior and interior of a gas turbine engine.

SUMMARY

A monolithic lead separator includes a primary lead tube defining a primary channel, a plurality of secondary lead tubes formed monolithically with the primary lead tube and defining a plurality of secondary channels, an instrumentation lead splitter, and a cap. Each of the secondary channels intersects the primary channel. The instrumentation lead splitter comprises an aperture situated at the intersection of the primary channel and the secondary channels. The cap is positioned in the aperture in a fluid-tight manner.

A method for routing instrumentation leads includes threading an instrumentation lead through a wiring egress into a primary channel defined by a primary tube. The instrumentation lead is routed to an intersection point of the primary channel and a plurality of secondary channels. The instrumentation lead is accessed through an aperture at the intersection of the primary channel and the plurality of secondary channels to route the instrumentation lead from the intersection point to a secondary channel defined by one of a plurality of secondary tubes monolithically formed with the primary tube. These steps can be repeated until a desired quantity of instrumentation leads have been routed to each of the plurality of secondary channels.

A method of making an instrumentation lead splitter includes depositing a layer of a pulverant material on a work stage, the layer having a thickness. At least a portion of the layer is selectively sintered based upon data that defines an instrumentation lead splitter having a primary tube portion and a plurality of secondary tube portions connected at an intersection point with an aperture. The work stage is lowered by the thickness. These steps can be repeated until the instrumentation lead splitter is complete. The instrumentation lead splitter can then be removed from the work stage.

DETAILED DESCRIPTION

Figure 1:
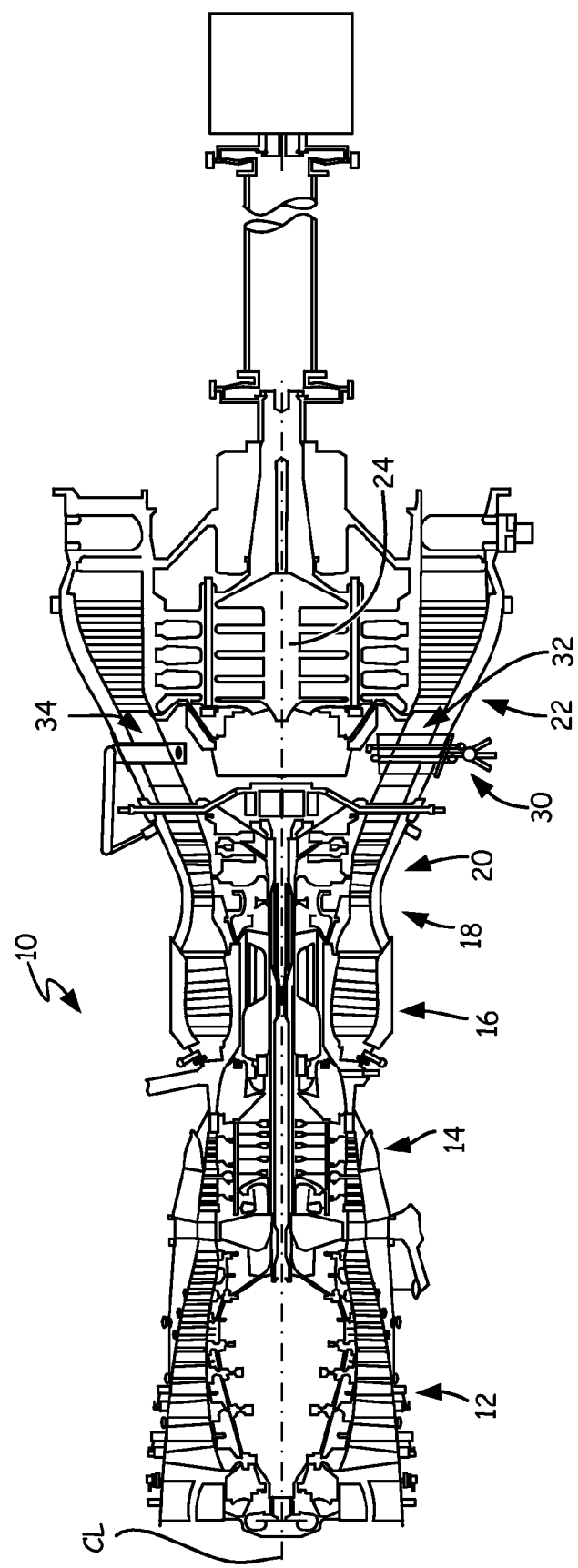
FIG. 1 is a generic cross-sectional view of an industrial gas turbine engine.

FIG. 1 is a cross section of generic industrial gas turbine engine 10, which is circumferentially disposed about a As known in the art of gas turbines, incoming ambient air is serially pressurized by low pressure compressor 12 and high pressure compressor 14. The pressurized air is sent to combustor 16, where it mixes with fuel and is ignited. Once burned, the resulting combustion products expand serially through high pressure turbine 18, low pressure turbine 20, and power turbine 22 thereby producing usable work. High pressure turbine 18 and low pressure turbine 20 drive high pressure compressor 14 and low pressure compressor 12 through high and low rotor shafts, respectively. Power turbine 22 powers, for example, electrical generator 24. The present application also applies to aero engines, and engines with more or fewer sections than illustrated.

Oil tubes 30 extend from an exterior of industrial gas turbine engine 10 to an interior of industrial gas turbine engine 10 in front of power turbine 22. In the embodiment shown, oil tubes 30 are surrounded by oil strut 32. Oil strut 32 extends through a flow path between low pressure turbine 20 and power turbine 22. Oil strut 32 is capable of holding oil tubes 30 and a plurality of wires that run between an exterior of industrial gas turbine engine 10 and an interior of industrial gas turbine engine 10.

Struts are used throughout gas turbine engines to transfer mechanical loads on a liner, duct, compressor section, or turbine section to a frame, or from the frame to an engine mount. This can be seen with strut 34 that spans the flow path between lower pressure turbine 20 and power turbine 22. Struts can also be used to house wires, tubes, and other components that need to be passed from an outside of industrial gas turbine engine 10 to an inside of industrial gas turbine engine 10. An example and non-limiting embodiment of oil strut 32 is shown in FIGS. 2-6.

Figure 2:
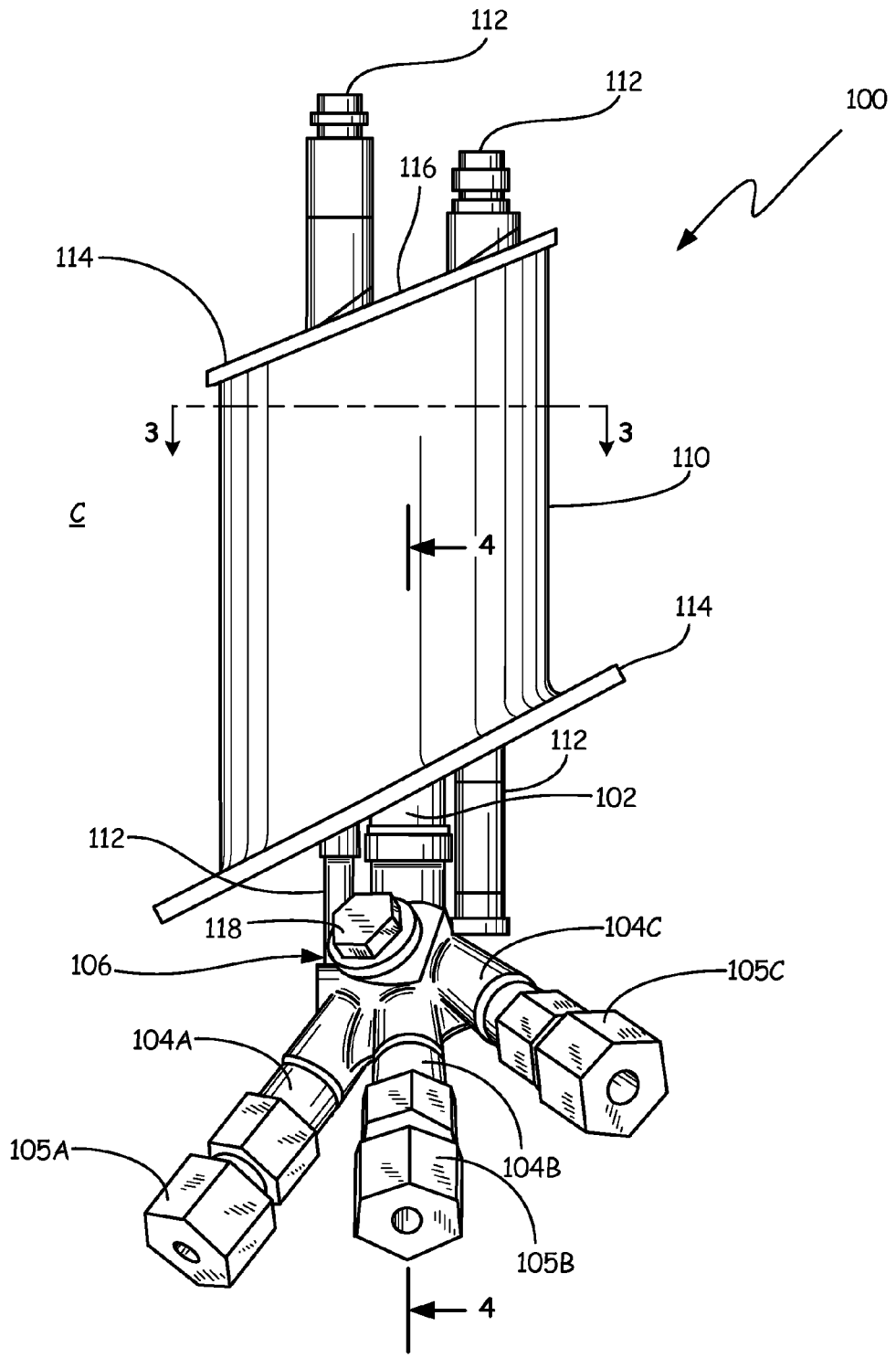
FIG. 2 is a perspective view of a monolithic oil strut/instrumentation lead separator.

FIG. 2 is a perspective view of monolithic oil strut/instrumentation lead separator 100. Monolithic oil strut/instrumentation lead separator 100 includes primary lead tube 102, secondary lead tubes 104A-104C, instrumentation lead separator 106, oil strut 110, oil tubes 112, flanges 114, and wiring egress 116. FIG. 2 also includes compression fittings 105A-105C, cap 118, and core flow C. The components shown in FIG. 2 are portions of industrial gas turbine engine 10, as seen in FIG. 1, located between low pressure turbine 20 and power turbine 22. In alternative embodiments, monolithic oil strut/instrumentation lead separator 100 may be located at any other suitable location in industrial gas turbine engine 10.

Primary lead tube 102 is a hollow component through which wiring and/or tubing may pass. Primary lead tube 102 is an additively manufactured portion of monolithic oil strut/instrumentation lead separator 100. Primary lead tube 102 has a smooth interior surface, free from discontinuities which may snag or damage wiring or tubing passing through.

Secondary lead tubes 104A-104C are also hollow components through which wiring and/or tubing may pass. All of the wiring and/or tubing that passes through each of secondary lead tubes 104 also passes through primary lead tube 102. Secondary lead tubes 104A-104C are also additively manufactured, and are free from discontinuities which may snag or damage wiring or tubing passing through. In the embodiment shown in FIG. 2, there are three secondary lead tubes 104. In alternate embodiments, there can be any number of secondary lead tubes 104.

Compression fittings 105A-105C are hollow components that can be attached to an end of secondary lead tubes 104A-104C. Compression fitting 105A can be attached to secondary lead tube 104A, compression fitting 105B can be attached to secondary lead tube 104B, and compression fitting 105C can be attached to secondary lead tube 104C. Compression fittings 105A-105C are create a sealed fit between secondary lead tubes 104 and any tube that secondary lead tubes 104 are connected to.

Instrumentation lead separator 106 is a portion of monolithic oil strut/instrumentation lead separator 100 that facilitates access to wiring and/or tubing within primary lead tube 102 and secondary lead tubes 104A-104C. Here, instrumentation lead separator 106 includes an aperture to provide access to wiring contained within primary lead tube 102 and secondary lead tubes 104. Cap 118 permits for hermetic sealing of primary lead tube 102 and secondary lead tubes 104A-104C.

Oil strut 110 is a monolithically formed part of monolithic oil strut/instrumentation lead separator 100. In particular, oil strut 110 acts as a housing, and is shaped as an airfoil. Oil strut 110 is a variant of known oil struts, which are used to transmit oil between exterior and interior circumferential portions of a gas turbine engine.

Oil tubes 112 are monolithically formed parts of monolithic oil strut/instrumentation lead separator 100. Oil tubes 112 transmit oil between exterior and interior circumferential portions of gas turbine engine 10 (see FIG. 1). In alternative embodiments, oil tubes 112 need not be additively manufactured, and may be inserted separately through oil strut 110.

Flanges 114 are external ridges for attachment to adjacent components, such industrial gas turbine engine 10 (see FIG. 1). Flanges 114 are used to form a seal with such adjacent components, in order to contain core flow C.

Wiring egress 116 is an aperture formed in oil strut 110, such that wiring and/or tubing that passes through primary lead tube 102 may be routed to appropriate sensors or other components.

Primary lead tube 102 is connected to secondary lead tubes 104A-104C at instrumentation lead separator 106. Oil strut 110 circumscribes primary lead tube 102 and provides a surface over which core flow C passes. Oil strut 110 also circumscribes at least a portion of oil tubes 112. Flanges 114 are located on opposite ends of oil strut 110, such that oil strut 110 may be mounted into industrial gas turbine engine 10, and so that core flow C is contained and prevented from significant leakage. Wiring egress 116 allows for egress of wiring, tubing, or any other feature passing through primary lead tube 102 and any one of secondary lead tubes 104 to be routed away from monolithic oil strut/instrumentation lead separator 100. Cap 118 is fitted in instrumentation lead separator 106 so that an interior cavity defined by primary lead tube 102 and secondary lead tubes 104A-104C is closed off.

Leads (not shown) such as wiring, tubing, and other features may be routed through wiring egress 116, through primary lead tube 102, and through secondary lead tubes 104A-104C. In order to properly route such features to the appropriate secondary lead tube 104, instrumentation lead separator 106 allows access to wiring, tubing, or other features while cap 118 is not present. Leads may be routed to appropriate locations based on their function. For example, pressure tubing may all be routed to one of secondary lead tubes 104A-104C in order to be directed to an appropriate location in industrial gas turbine engine 10 (see FIG. 1) for sampling of core flow C.

Monolithic oil strut/instrumentation lead separator 100 allows for passage of a much larger number of leads (not shown) such as wires, tube, or other features than previously available oil struts. Previously available egress systems were limited due to the use of standard compression fittings 105A-105C that only allow a set number of leads through. Splitting primary lead tube 102 into secondary lead tubes 104A-104C allows leads to be separated into secondary lead tubes 104A-104C and then through standard compression fittings 105A-105C. Using standard compression fittings 105A-105C is advantageous, as it is cheaper and quicker to use parts that are readily available.

Monolithic oil strut/instrumentation lead separator 100 is further advantageous, as it is capable of holding a larger number of leads without concern of breakage or bottlenecks. Because monolithic oil strut/instrumentation lead separator 100 is additively manufactured, the interior cavity formed by primary lead tube 102 and secondary lead tubes 104A-104C is free from joints, such as those formed by welding, brazing, or other fastening techniques. The smooth, continuous surface allows for passage of a greater number of leads without the bottlenecks formed by such connections, and without risk of stripping the protective sheaths on such leads by pulling them against sharp edges formed at such joints.

Furthermore, instrumentation lead separator 106 allows for separation of leads to desired final locations. With cap 118 removed, leads may be manually directed towards any desired secondary lead tube 104. This significantly reduces the amount of post-installation efforts to route leads to their appropriate final destinations. Being able to route the larger number of leads to the desired secondary lead tube 104 is also advantageous as it is a gentle transition so that the leads don't break or bottleneck when they are directed into secondary lead tubes 104.

Figure 3:
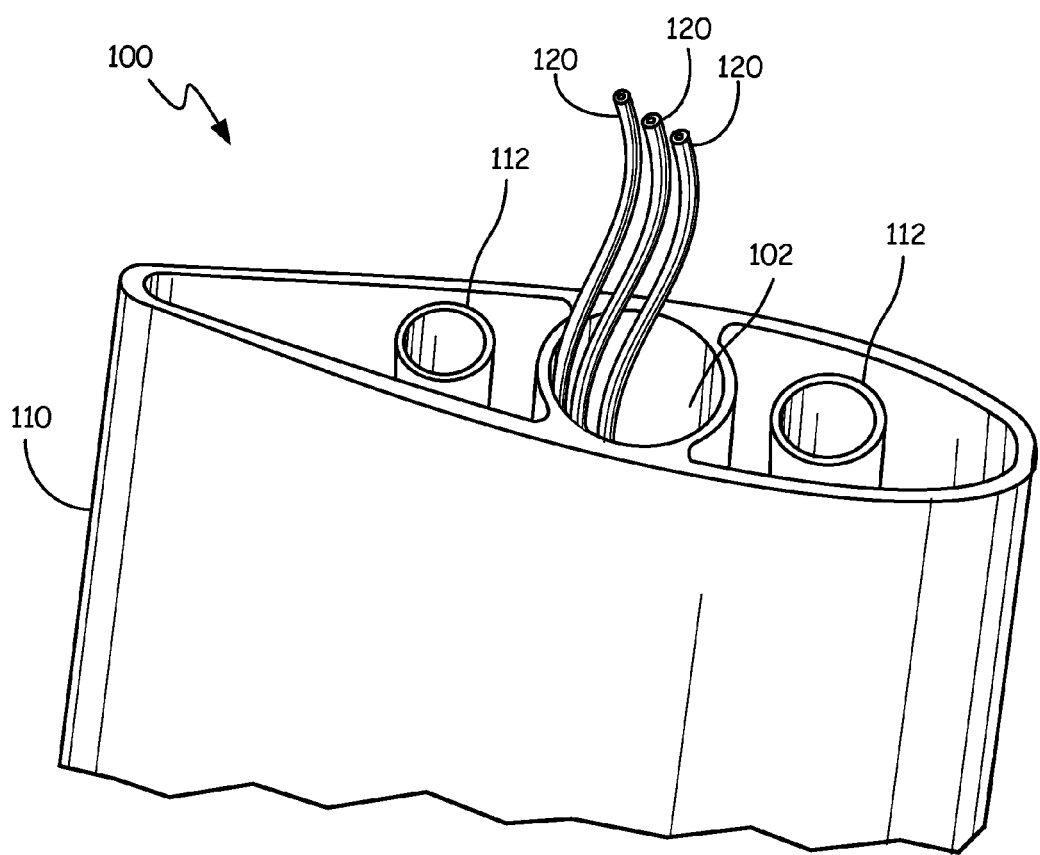
FIG. 3 is a cutaway view along line 3-3 of FIG. 2, showing the interior of the airfoil portion of the oil strut.

FIG. 3 is a cutaway view along line 3-3 of FIG. 2, showing leads 120 passing through primary lead tube 102. As described with respect to FIG. 2, monolithic oil strut/instrumentation lead separator 100 is a monolithic, additively manufactured object with a number of sub-parts, including primary lead tube 102, oil strut 110, and oil tubes 112. Leads 120 pass through portions of monolithic oil strut/instrumentation lead separator 100.

Leads 120 are shown extending from primary lead tube 102. Primary lead tube 102 is monolithically formed with oil strut 110. Primary lead tube 102 is a right circular cylinder, circumscribed by and joined to oil strut 110, which is shaped as an airfoil. In alternative embodiments, these shapes may be modified; for example, primary lead tube 102 could be an elliptic cylinder or any other shape to contain leads 120 as they pass from one end of oil strut 110 to the other. Additionally, oil strut 110 may be any other shape that contains both primary lead tube 102 and oil tubes 112.

Oil strut 110 contains and protects oil tubes 112 and primary lead tube 102 from foreign objects and stresses related to flow surrounding oil strut 110. Oil strut 110 has a more streamlined shape than primary lead tube 102 or oil tubes 112, and thus promotes laminar flow around primary lead tube 102 and oil tubes 112. Leads 120 are separated from other components, such as oil tubes 112, by primary lead tube 102. In this way, leads 120 are protected from damage due to abrasion or overheating that could be caused by contact with other components, such as oil tubes 112 or core flow C (see FIG. 1).

Figure 4:
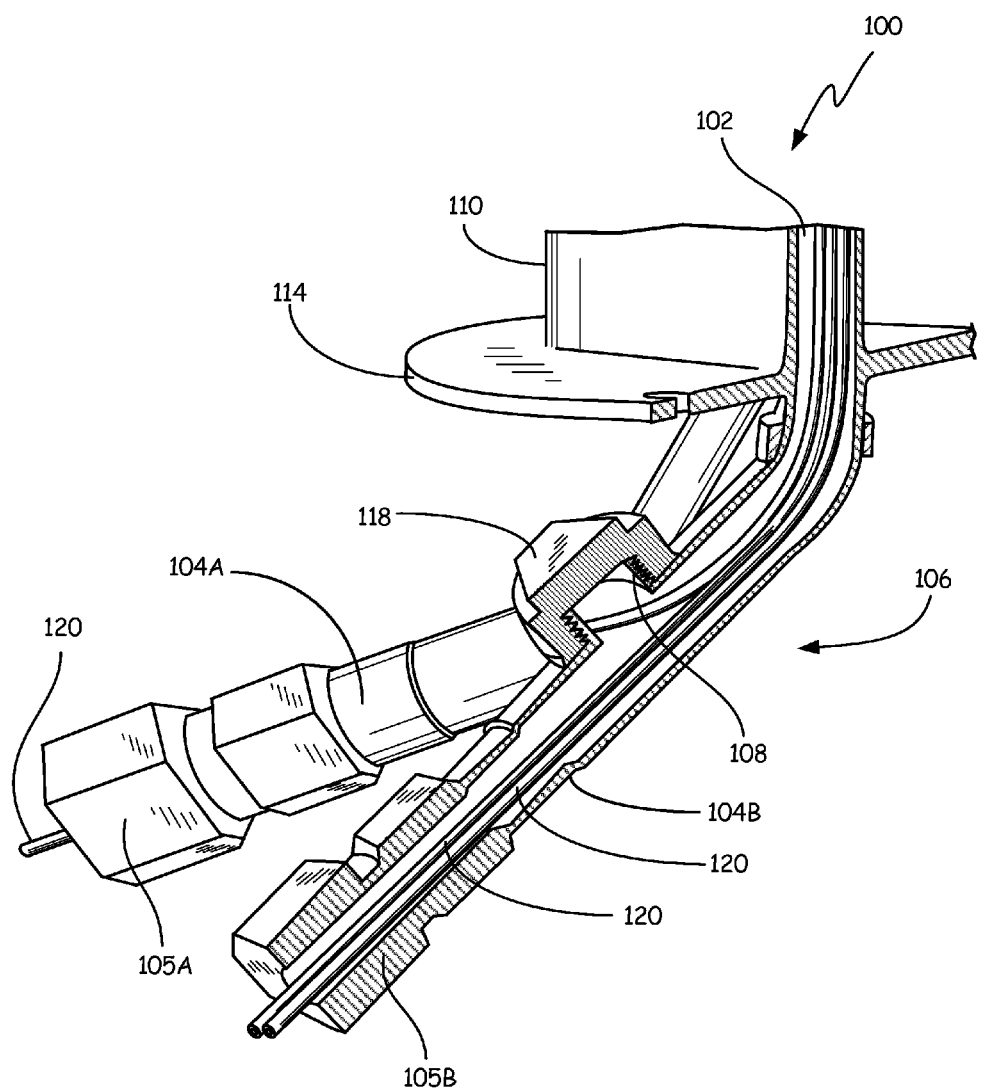
FIG. 4 is a cutaway view along line 4-4 of FIG. 2, showing the interior of an instrumentation lead separator.

FIG. 4 is a perspective, cutaway view of monolithic oil strut/instrumentation lead separator 100, taken along line 4-4 of FIG. 2. FIG. 4 shows two of the three secondary lead tubes 104A-104B of monolithic oil strut/instrumentation lead separator 100. However, in general, monolithic oil strut/instrumentation lead separator 100 may have any number of secondary lead tubes.

Monolithic oil strut/instrumentation lead separator 100 includes primary lead tube 102, secondary lead tubes 104A-104B, instrumentation lead separator 106, traffic management port 108, oil strut 110, and flange 114. FIG. 4 also includes compression fittings 105A-105B and cap 118.

Monolithic oil strut/instrumentation lead separator 100 is an additively manufactured component, and each of its sub-components are connected to one another in an undivided, continuous, and smooth fashion. Cap 118 is attached to monolithic oil strut/instrumentation lead separator 100 at traffic management port 108. Traffic management port 108 is threaded in order to receive cap 118.

Leads 120 are routed through primary lead tube 102 to secondary lead tubes 104 at instrumentation lead separator 106. The region where each of secondary lead tubes 104 and primary lead tube 102 meet is substantially smooth and free of discontinuities. Furthermore, the region where each of secondary lead tubes 104A-104B and primary lead tube 102 meet is near the location of instrumentation lead separator 106. Instrumentation lead separator 106 is recessed into the wall of the channel defined by primary lead tube 102 and secondary lead tubes 104A-104B. Thus, instrumentation separator 106 does not impinge upon the channel defined by primary lead tube 102 and secondary lead tubes 104A-104B.

Secondary lead tubes 104A-104B are connected to compression fittings 105A-105B at an end of secondary lead tubes 104A-104B. Compression fittings 105A-105B are standard compression fittings that are readily available in the industry and that can be used to connect secondary lead tubes 104A-104B to other tubes. Using standard compression fittings in combination with monolithic oil strut/instrumentation lead separator 100 is advantageous as it saves time and money.

Monolithic oil strut/instrumentation lead separator 100 is made by additive manufacturing. Thus, no discontinuities or sharp edges are present on the surface along which leads 120 may make contact. Instrumentation lead separator 106 is proximate to the region where the channel defined by primary lead tube 102 and secondary lead tubes 104A-104B splits. On one side of instrumentation lead separator 106, a single channel is defined by primary lead tube 102. On the opposite end of instrumentation lead separator 106, there are multiple channels defined by secondary lead tubes 104A-104B.

Figure 5:
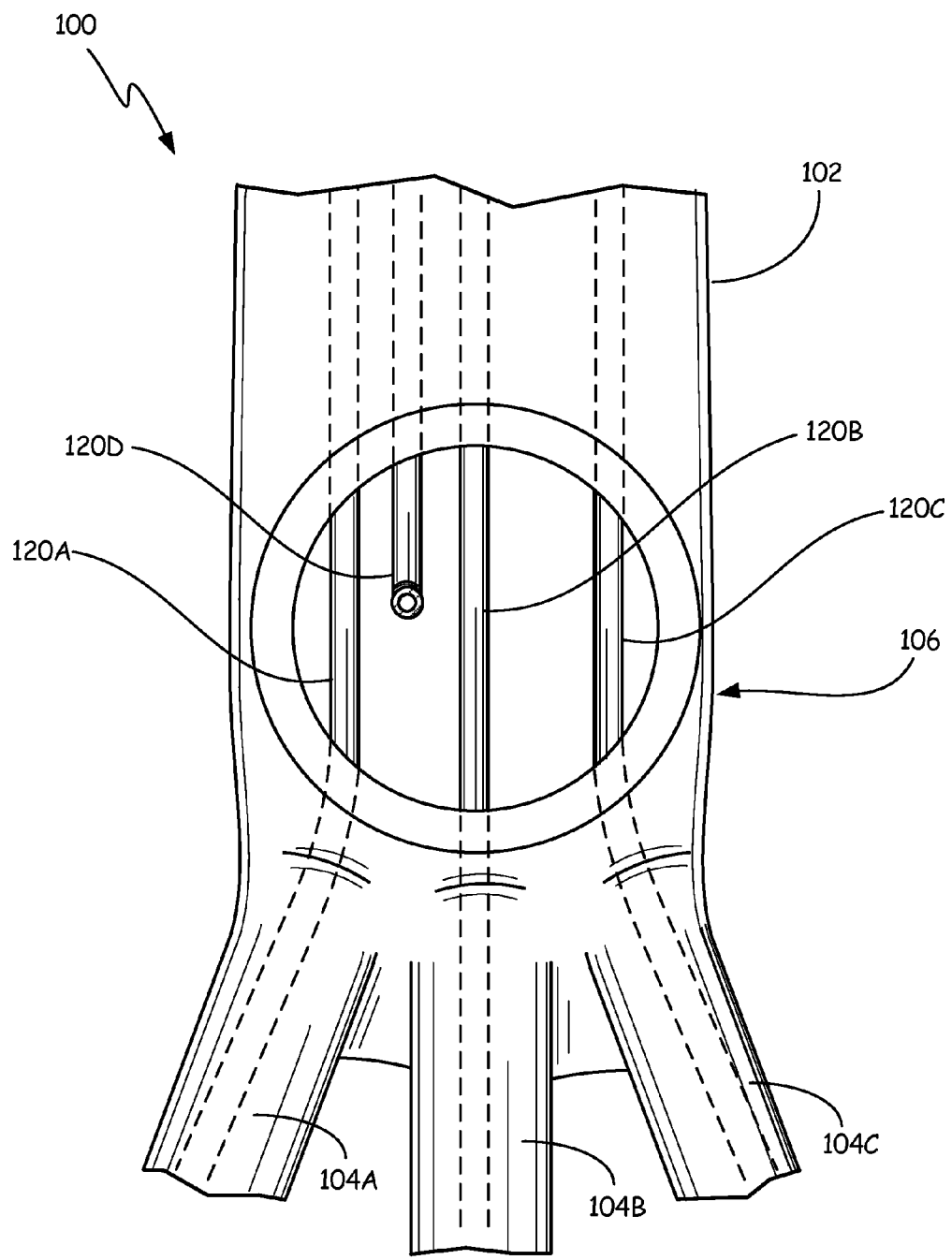
FIG. 5 is a plan view showing the instrumentation lead splitter open, with leads.

FIG. 5 also shows monolithic oil strut/instrumentation lead separator 100. In particular, FIG. 5 shows a plan view of instrumentation lead separator 106 open, exposing leads 120A-120D. In this embodiment, lead 120D is only partially routed through monolithic oil strut/instrumentation lead separator 100.

Monolithic oil strut/instrumentation lead separator 100 includes primary lead tube 102, secondary lead tubes 104A-104C, and instrumentation lead separator 106. Leads 120A-120D are also shown.

The channel defined by primary lead tube 102 splits into three channels defined by each of secondary lead tubes 104A, 104B, and 104C. Leads 120A-120D are shown passing through a channel defined by primary lead tube 102. At the disjunction of secondary lead tubes 104A-104C, leads 120A-120C separate into each of the three secondary lead tubes 104A-104C, respectively. In alternative embodiments, multiple leads may be routed to each of secondary lead tubes 104A-104C.

Lead 120D is shown extending through primary lead tube 102 to instrumentation lead separator 106. Because instrumentation lead separator 106 is open, in that it is not sealed (such as the seal formed by cap 118, FIG. 4), an end of lead 120D is accessible through the aperture formed by lead separator 106. In general, leads are assembled in monolithic oil strut/instrumentation lead separator 100 by first passing leads 120 through an aperture at one end, such as wiring egress 116 (FIG. 2). Leads 120 are then passed through a channel formed in primary lead tube 102 towards secondary lead tubes 104. Instrumentation lead separator 106 is formed at or near the separation of the channel defined by primary lead tube 102 into multiple channels defined by secondary lead tubes 104. As leads 120 become accessible via instrumentation lead separator 106, they are routed to a desired secondary lead tube 104. After all of leads 120 have been routed to a desired secondary lead tube 104, instrumentation lead separator 106 may be closed off, as with cap 118 (FIG. 4).

Figure 6:
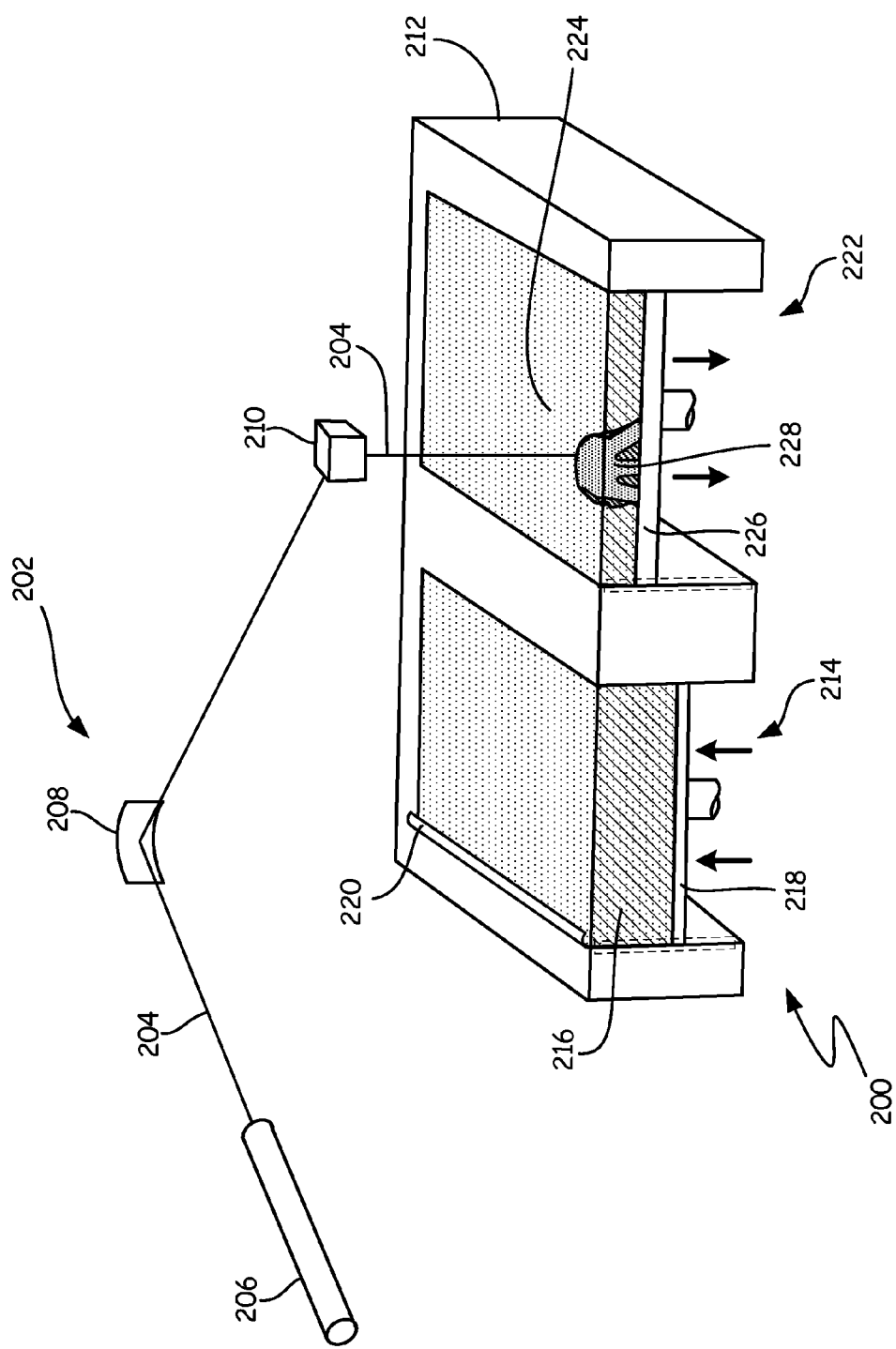
FIG. 6 is a cross-sectional perspective view of an additive manufacturing apparatus.

FIG. 6 shows additive manufacturing system 200. In particular, FIG. 6 shows a direct metal laser sintering apparatus. Additive manufacturing system 200 is one of a variety of additive manufacturing devices which are capable of building monolithic oil strut/instrumentation lead separator 228. Additive manufacturing system 200 builds parts in a layerwise fashion, such that finished parts made by additive manufacturing system 200 are monolithic. Additive manufacturing system 200 may be used to build a variety of components as a single solid piece which would require construction in multiple parts using traditional manufacturing processes, or which may have discontinuities or sharp edges due to welding of joints or other traditional manufacturing processes.

Additive manufacturing system 200 includes optical system 202. Optical system includes radiation beam 204, radiation source 206, mirror 208, and movable optical head 210. Radiation beam 204 is a laser beam. Radiation beam 204 emanates from radiation source 206, and travels towards mirror 208. Mirror 208 reflects radiation beam 204 towards movable optical head 210. Movable optical head 210 reflects radiation beam 204 towards a desired target.

Additive manufacturing system 200 also includes frame 212. Frame 212 provides physical support for other components that make up additive manufacturing system 200. Frame 212 may be, for example, a solid metal structure defining interior voids to contain other components of additive manufacturing system 200.

Additive manufacturing system 200 includes material supply system 214. Material supply system 214 is a system for delivering material used in additive manufacturing. As shown in FIG. 6, material supply system 214 includes sinterable material 216 and supply platform 218. Sinterable material 216 may be, for example, a powdered metal that is at least partially sinterable to form a solid part. Supply platform 218 is a platform that may be raised or lowered with respect to frame 212 in order to facilitate the supply of sinterable material 216.

Additive manufacturing system 200 also includes spreader 220. Spreader 220 is used to transfer sinterable material 216 from supply system 214 to a desired location for additive manufacturing.

Additive manufacturing system 200 also includes build station 222. Build station 222 includes working layer 224 and build platform 226. Working layer 226 consists of a surface layer of sinterable material that is positioned to be sinterable by radiation beam 204. Build platform 226 is a platform that is movable with respect to frame 212 in order to facilitate layerwise construction of components by additive manufacturing system 200.

Monolithic oil strut/instrumentation lead separator 228 is a partially built component made by additive manufacturing system 200. Monolithic oil strut/instrumentation lead separator 228 is built by additive manufacturing system 200 as a single component. Monolithic oil strut/instrumentation lead separator 228 defines an interior cavity, which does not have sharp edges or other discontinuities along its interior.

Radiation beam 204 is directed towards working layer 224 by optical system 202. Radiation source 206 generates radiation beam, which is deflected by mirror 208 and movable optical head 210 to selectively heat portions of working layer 224. By moving mirror and movable optical head 210, a desired pattern of sintered material may be generated in working layer 224. Typically, a slice or layer of a three-dimensional part is made in working layer 224.

Once the layer is complete, material supply system 214 provides additional sinterable material 216. In particular, sinterable material 216 is positioned above a surface of frame 212 when supply platform 218 is raised. Spreader 220 transfers sinterable material 216 across the surface of frame 212 towards build station 222. Meanwhile, build station 222 prepares to receive sinterable material 216 by lowering build platform 226 by a distance proportional to the amount supply platform 218 was raised. Sinterable material 216 displaces the gap left when build platform 226 was lowered, which results in a new working layer 224 of unsintered sinterable material 216.

By repeating this process multiple times, monolithic oil strut/instrumentation lead separator 228 may be generated in a layerwise fashion. This process is only one potential additive manufacturing method for generating monolithic oil strut/instrumentation lead separator 228. In other embodiments, there may be powder or liquid sinterable material 216. Additive manufacturing apparatus 200 may employ stereolithography, electron beam melting, or laser powder deposition, among other forms of additive manufacturing that are known in the field.

DISCUSSION OF POSSIBLE EMBODIMENTS

The following are non-exclusive descriptions of possible embodiments of the present invention.

An instrumentation lead separator includes a monolithic primary lead tube defining a primary channel, a plurality of secondary lead tubes formed monolithically with the primary lead tube and defining a plurality of secondary channels, each of the secondary channels intersecting the primary channel, an instrumentation lead splitter comprising an aperture situated at the intersection of the primary channel and the secondary channels, and a cap positioned in the aperture in a fluid-tight manner.

The monolithic lead separator of the preceding paragraph can optionally include, additionally and/or alternatively, any one or more of the following features, configurations, and/or additional components.

The monolithic lead separator may also include a plurality of leads, each of the leads passing through the primary passage, and a portion of the plurality of leads passing through each of the plurality of secondary passages. The plurality of leads may include tubes and wires. The primary tube channel and the secondary tube channels may be substantially smooth to avoid damaging leads passing therethrough. The intersection between the primary tube channel and the secondary tube channels may also be substantially smooth to avoid damaging leads passing therethrough. The monolithic lead separator may also include an airfoil portion surrounding the primary lead tube. The monolithic lead separator may also include at least one oil tube surrounded by the airfoil portion. In such case, the airfoil portion may be formed monolithically with the primary tube and the plurality of secondary tubes. The primary tube and the plurality of secondary tubes may comprise a stack sintered pulverant material layers. The primary passage and the plurality of secondary passages may form a fluid-tight plenum.

A method for routing instrumentation leads includes: (a) threading an instrumentation lead through a wiring egress into a primary channel defined by a primary tube; (b) routing the instrumentation lead to an intersection point of the primary channel and a plurality of secondary channels; (c) accessing the lead through an aperture at the intersection of the primary channel and the plurality of secondary channels to route the lead from the intersection point to a secondary channel defined by one of a plurality of secondary tubes monolithically formed with the primary tube; and (d) repeating steps (a)-(c) until a desired quantity of leads have been routed to each of the plurality of secondary channels.

The method of the preceding paragraph can optionally include, additionally and/or alternatively, any one or more of the following features, steps, and/or additional components.

The method may further comprise routing the lead to a secondary passage based on its function. The method may include leads selected from the group consisting of thermocouples, strain gauges, pressure tubing, and proximity gauges. Routing the lead to a secondary channel may include accessing the lead through an aperture and directing the lead towards the desired secondary channel. The method may further comprise sealing the primary channel and the plurality of secondary channels with a cap.

A method of making an instrumentation lead splitter comprises: (a) depositing a layer of a pulverant material on a work stage, the layer having a thickness; (b) selectively sintering at least a portion of the layer based upon data that defines an instrumentation lead splitter having a primary tube portion and a plurality of secondary tube portions connected at an intersection point with an aperture; (c) lowering the work stage by the thickness; (d) repeating steps (a)-(c) until the instrumentation lead splitter is complete; and (g) removing the instrumentation lead splitter from the work stage.

The method of the preceding paragraph can optionally include, additionally and/or alternatively, any one or more of the following features, steps, and/or additional components.

The method may further comprise attaching a cap to an aperture formed at the intersection point. The method may further comprise removing unsintered material from the instrumentation lead splitter. Selectively sintering at least a portion of the layer may include sintering a portion of the layer corresponding to an oil strut surrounding the primary tube portion. Selectively sintering at least a portion of the layer may include sintering a portion of the layer corresponding to an oil tube surrounded by the oil strut. The oil strut may be streamlined and include a wiring egress.

Although the present invention has been described with reference to preferred embodiments, workers skilled in the art will recognize that changes may be made in form and detail without departing from the spirit and scope of the invention.

The invention claimed is:

1. An instrumentation lead separator comprising:
   a monolithic primary lead tube defining a primary channel;
   a plurality of secondary lead tubes formed monolithically with the primary lead tube and defining a plurality of secondary channels, each of the secondary channels intersecting the primary channel;
   an instrumentation lead splitter comprising an aperture situated at the intersection of the primary channel and the secondary channels; and
   a cap positioned in the aperture in a fluid-tight manner.

2. The instrumentation lead separator of claim 1, and further comprising a plurality of leads, each of the leads passing through the primary passage, and a portion of the plurality of leads passing through each of the plurality of secondary passages.

3. The instrumentation lead separator of claim 2, wherein the plurality of leads include tubes and wires.

4. The instrumentation lead separator of claim 1, wherein the primary tube channel and the secondary tube channels are substantially smooth to avoid damaging leads passing therethrough.

5. The instrumentation lead separator of claim 4, wherein the intersection between the primary tube channel and the secondary tube channels is also substantially smooth to avoid damaging leads passing therethrough.

6. The instrumentation lead separator of claim 1, and further comprising an airfoil portion surrounding and joined to the primary lead tube.

7. The instrumentation lead separator of claim 6, and further comprising at least one oil tube surrounded by the airfoil portion.

8. The instrumentation lead separator of claim 7, wherein the airfoil portion is formed monolithically with the primary tube and the plurality of secondary tubes.

9. The instrumentation lead separator of claim 1, wherein the primary tube and the plurality of secondary tubes comprise a stack of sintered pulverant material layers.

10. The instrumentation lead separator of claim 1, wherein the primary passage and the plurality of secondary passages form a fluid-tight plenum.

11. A method for routing instrumentation leads, the method comprising:
    (a) threading an instrumentation lead through a wiring egress into a primary channel defined by a primary tube;
    (b) routing the instrumentation lead to an intersection point of the primary channel and a plurality of secondary channels;
    (c) accessing the instrumentation lead through an aperture at the intersection of the primary channel and the plurality of secondary channels to route the instrumentation lead from the intersection point to a secondary channel defined by one of a plurality of secondary tubes monolithically formed with the primary tube; and
    (d) repeating steps (a)-(c) until a desired quantity of leads have been routed to each of the plurality of secondary channels.

12. The method of claim 11, and further comprising routing the instrumentation lead to a secondary passage based on its function.

13. The method of claim 11, wherein each lead is one the group consisting of:
    thermocouples;
    strain gauges;
    pressure tubing; and
    proximity gauges.

14. The method of claim 11, wherein routing the instrumentation lead to a secondary channel includes accessing the instrumentation lead through an aperture and directing the instrumentation lead towards the desired secondary channel.

15. The method of claim 11, and further comprising sealing the primary channel and the plurality of secondary channels with a cap.

16. A method of making an instrumentation lead splitter, the method comprising:
    (a) depositing a layer of a pulverant material on a work stage, the layer having a thickness;
    (b) selectively sintering at least a portion of the layer based upon data that defines an instrumentation lead splitter having a primary tube portion and a plurality of secondary tube portions connected at an intersection point with an aperture;
    (c) lowering the work stage by the thickness;
    (d) repeating steps (a)-(c) until the instrumentation lead splitter is complete; and
    (g) removing the instrumentation lead splitter from the work stage.

17. The method of claim 16, and further comprising attaching a cap to an aperture formed at the intersection point.

18. The method of claim 16, and further comprising removing unsintered material from the instrumentation lead splitter.

19. The method of claim 16, wherein selectively sintering at least a portion of the layer includes sintering a portion of the layer corresponding to an oil strut surrounding the primary tube portion.

20. The method of claim 19, wherein selectively sintering at least a portion of the layer includes sintering a portion of the layer corresponding to an oil tube surrounded by the oil strut, and wherein the oil strut is streamlined and comprises a wiring egress.

* * * * *